(12) United States Patent
Jenree et al.

(10) Patent No.: US 10,253,493 B2
(45) Date of Patent: Apr. 9, 2019

(54) PARTICULATES HAVING HIGH TOTAL SOLAR REFLECTANCE

(71) Applicant: U.S. Silica Company, Frederick, MD (US)

(72) Inventors: Rhonda Marie Jenree, Berkeley Springs, WV (US); Rocky Lee Smith, Needmore, PA (US); Shih-Jen Wu, Hagerstown, MD (US); David Earl Weller, Jr., Greencastle, PA (US)

(73) Assignee: U.S. Silica Company, Frederick, MD (US)

( * ) Notice: Subject to any disclaimer, the term of this patent is extended or adjusted under 35 U.S.C. 154(b) by 0 days.

(21) Appl. No.: 15/250,772

(22) Filed: Aug. 29, 2016

(65) Prior Publication Data

US 2018/0058065 A1     Mar. 1, 2018

(51) Int. Cl.
| | | |
|---|---|---|
| *E04B 1/78* | (2006.01) |
| *B05D 3/00* | (2006.01) |
| *C04B 18/02* | (2006.01) |
| *C04B 20/04* | (2006.01) |
| *C04B 20/10* | (2006.01) |
| *C04B 33/04* | (2006.01) |
| *C08K 3/20* | (2006.01) |
| *C08K 3/34* | (2006.01) |
| *C08K 3/36* | (2006.01) |
| *C09C 1/00* | (2006.01) |
| *C09D 183/00* | (2006.01) |
| *C09D 183/04* | (2006.01) |
| *C09D 183/06* | (2006.01) |
| *E04D 11/02* | (2006.01) |
| *C04B 35/626* | (2006.01) |

(52) U.S. Cl.
CPC ............... *E04B 1/78* (2013.01); *B05D 3/002* (2013.01); *B05D 3/007* (2013.01); *C04B 18/023* (2013.01); *C04B 20/04* (2013.01); *C04B 20/1051* (2013.01); *C04B 33/04* (2013.01); *C04B 35/62675* (2013.01); *C08K 3/20* (2013.01); *C08K 3/34* (2013.01); *C08K 3/346* (2013.01); *C08K 3/36* (2013.01); *C09C 1/0081* (2013.01); *C09D 183/00* (2013.01); *C09D 183/04* (2013.01); *C09D 183/06* (2013.01); *E04D 11/02* (2013.01); *C04B 2235/3206* (2013.01); *C04B 2235/3208* (2013.01); *C04B 2235/3215* (2013.01); *C04B 2235/3284* (2013.01); *C04B 2235/448* (2013.01)

(58) Field of Classification Search
CPC .......... E04B 1/78; B05D 3/002; B05D 3/007; C09C 1/0081; E04D 11/02; C04B 18/023; C04B 20/04; C04B 20/1051; C04B 33/04; C04B 35/62675; C04B 2235/3206; C04B 2235/3208; C04B 2235/3215; C04B 2235/3284; C04B 2235/448; C08K 3/20; C08K 3/34; C08K 3/346; C08K 3/36; C09D 183/00; C09D 183/04; C09D 183/06

USPC ........................................................ 252/587
See application file for complete search history.

(56) References Cited

U.S. PATENT DOCUMENTS

| | | |
|---|---|---|
| 6,872,440 B1 | 3/2005 | Kiik et al. |
| 7,212,560 B2 | 5/2007 | Oh et al. |
| 7,241,500 B2 | 7/2007 | Shiao et al. |
| 7,421,500 B2 | 9/2008 | Talwar et al. |
| 7,422,989 B2 | 9/2008 | Kalkanoglu et al. |
| 7,592,066 B2 | 9/2009 | Shiao et al. |
| 8,114,516 B2 | 2/2012 | Shiao et al. |
| 8,277,881 B2 | 10/2012 | Khan et al. |
| 8,361,597 B2 | 1/2013 | Shiao et al. |
| 8,530,034 B2 | 9/2013 | Khan et al. |
| 8,535,803 B2 | 9/2013 | Shiao et al. |
| 8,574,712 B2 | 11/2013 | Wood et al. |
| 8,628,850 B2 | 1/2014 | Shiao et al. |
| 8,865,303 B2 | 10/2014 | Sexauer et al. |
| 9,044,921 B2 | 6/2015 | Kalkanoglu et al. |
| 2002/0160151 A1 | 10/2002 | Pinault et al. |
| 2004/0229053 A1 | 11/2004 | Ahluwalia et al. |
| 2005/0072114 A1 | 4/2005 | Shiao et al. |
| 2006/0251807 A1 | 11/2006 | Hong et al. |
| 2007/0054129 A1 | 3/2007 | Kalkanoglu et al. |
| 2007/0077361 A1 | 4/2007 | Shiao et al. |
| 2007/0218251 A1 | 9/2007 | Jacobs et al. |

(Continued)

FOREIGN PATENT DOCUMENTS

| | | |
|---|---|---|
| JP | 2003082289 A | 3/2003 |
| JP | 2008006391 A | 1/2008 |

(Continued)

OTHER PUBLICATIONS

Rodriguez, Juan M. et al., "Particle Shape Quantities and Measurement Techniques—A Review", Edge, vol. 18 (2013), Bund. A, pp. 169-198.

(Continued)

*Primary Examiner* — Ling Siu Choi
*Assistant Examiner* — Ronald Grinsted
(74) *Attorney, Agent, or Firm* — Lewis Roca Rothgerber Christie LLP

(57) ABSTRACT

A reflective particulate composition includes a particulate mixture that includes a particulate substrate, a hardness enhancer and a pigment. The reflective particulate substrate has a hydrophobic coating on the particulate mixture. The composition may have a solar reflectance of 70% or greater. The pigment may include a clay, and the particulate substrate may include a feldspar. A method of making the composition may include mixing the particulate substrate, the hardness enhancer, and the pigment to form a particulate mixture, heat treating the particulate mixture, and coating the heat treated mixture with the hydrophobic coating.

22 Claims, No Drawings

(56) References Cited

U.S. PATENT DOCUMENTS

| | | |
|---|---|---|
| 2008/0241472 A1 | 10/2008 | Shiao et al. |
| 2008/0248242 A1 | 10/2008 | Shiao et al. |
| 2008/0261007 A1 | 10/2008 | Hong et al. |
| 2008/0277056 A1 | 11/2008 | Kalkanoglu et al. |
| 2009/0064628 A1 | 3/2009 | Mellott, II et al. |
| 2010/0104809 A1 | 4/2010 | Duda et al. |
| 2010/0203336 A1 | 8/2010 | Shiao et al. |
| 2011/0081537 A1 | 4/2011 | Sexauer et al. |
| 2011/0223385 A1 | 9/2011 | Shiao et al. |
| 2011/0283836 A1 | 11/2011 | Hitchings et al. |
| 2011/0311774 A1 | 12/2011 | Giri et al. |
| 2012/0107625 A1 | 5/2012 | Smith et al. |
| 2012/0164385 A1 | 6/2012 | Heulings et al. |
| 2012/0288678 A1 | 11/2012 | Grube et al. |
| 2013/0108873 A1 | 5/2013 | Shiao et al. |
| 2013/0168616 A1 | 7/2013 | Shiao et al. |
| 2014/0120316 A1 | 5/2014 | Hong et al. |
| 2014/0370242 A1 | 12/2014 | Constantz et al. |
| 2015/0113901 A1 | 4/2015 | Bai et al. |
| 2015/0192698 A1* | 7/2015 | Joedicke .......... G02B 1/02 52/747.1 |

FOREIGN PATENT DOCUMENTS

| | | |
|---|---|---|
| WO | WO2013192336 A1 | 12/2013 |
| WO | WO 2015/112590 A1 | 7/2015 |

OTHER PUBLICATIONS

Extended European Search Report dated Nov. 6, 2017, issued in corresponding EP Application No. 17188309.3, 7 pages.

Japanese Patent Office Action dated Jul. 31, 2018 issued in corresponding JP Application No. 2017-160084, with English translation, 10 pages.

Canadian Patent Office Examination Report dated Sep. 10, 2018 issued in corresponding CA Application No. 2,977,222, 4 pages.

* cited by examiner

PARTICULATES HAVING HIGH TOTAL SOLAR REFLECTANCE

BACKGROUND

Commercial and residential roofs are continuously exposed to the outside elements, which are often harsh or extreme. Even under moderate external conditions, these roofs are exposed to environmental or weather conditions that affect the ability of the roofs to insulate the building or residence interiors from the effects of the environmental or weather conditions. In many parts of the world, during the summer months, roofs are continuously exposed to high heat and sunny conditions under which the roofing materials absorb solar energy and retain high levels of heat. As the roofs absorb the solar energy and retain heat, the conditions inside the underlying buildings or residences suffer adversely, which often causes the interiors to heat up to uncomfortable conditions. In order to remedy these conditions, the buildings or residences often resort to increased amounts of internal insulation, or increased use of artificial cooling systems (e.g., HVAC equipment). However, increasing the amount of insulation has a limited ability to reduce heat transfer, and increasing energy costs make the increased use of artificial cooling systems undesirable or even cost-prohibitive.

SUMMARY

According to embodiments of the present invention, a reflective particulate composition includes a particulate mixture of a particulate substrate, a hardness enhancer, and a pigment. The reflective particulate composition further includes a hydrophobic exterior coating on the particulate mixture. The reflective particulate composition may have a total solar reflectance of 70% or greater, for example, 80% or greater, or 90% or greater. Additionally, in some embodiments, the particulate mixture without the hydrophobic exterior coating may have a total solar reflectance of 70% or greater, for example, 80% or greater, or 90% or greater before coating with the hydrophobic coating (i.e., the uncoated particulate mixture may have a total solar reflectance of 70% or greater, for example, 80% or greater, or 90% or greater).

In some embodiments, the particulate substrate may comprise a feldspar, for example, nepheline syenite. The feldspar may be present in the particulate mixture in an amount of 20 wt % to 60 wt % based on 100 wt % of the particulate mixture. The particulate substrate may further include a silica-based sand. The silica-based sand may be present in the particulate mixture in an amount of 3 wt % to 20 wt % based on 100 wt % of the particulate mixture.

The hardness enhancer may include plaster of Paris, Epsom salt, aplite, calcium carbonate, magnesium carbonate, and/or sodium carbonate. For example, in some embodiments, the hardness enhancer may comprise plaster of Paris. The hardness enhancer may be present in an amount of 10 wt % or greater based on 100% by weight of the particulate mixture.

The pigment may include a clay-based pigment composition comprising a kaolin clay in an amount of 50% by weight or greater based 100% by weight of the clay-based pigment composition. In some embodiments, the pigment may be present in the particulate mixture in an amount of 45 wt % or less based on 100 wt % of the particulate mixture.

The clay-based pigment composition may further include a secondary pigment component, some examples of which include transition metal oxides, alkaline earth metal sulfates, metal silicates (e.g., alkaline earth metal silicates and/or alkali metal silicates), and cristobalite. For example, in some embodiments, the secondary pigment component may include Epsom salt, $BaSO_4$, $SrCO_3$, $BaCO_3$, $ZrSiO_4$, $Ca_2SiO_4$, $Ba_2SiO_4$, magnesium silicate, SnO and/or ZnO. In some embodiments, the secondary pigment component may be present in the particulate mixture in an amount of 1 wt % to 15 wt % based on 100 wt % of the particulate mixture.

According to embodiments of the present invention, a method of making the reflective particulate composition may include mixing the particulate substrate, the hardness enhancer, the pigment and a liquid medium to form a particulate mixture, heat treating the particulate mixture, mixing the heat treated particulate mixture with a hydrophobic coating composition to form the hydrophobic exterior coating on the particulate mixture. The method may further include crushing the particulate mixture prior to the heat treatment. In some embodiments, the method may further include drying and/or calcining the particulate mixture before the crushing.

In some embodiments, a method of making the reflective particulate composition may include mixing the particulate substrate, the hardness enhancer, the pigment and a liquid medium to form a particulate mixture. This method further includes drying the particulate mixture at a temperature up to about 800° C. to form a dried particulate mixture, and crushing the dried particulate mixture to form a crushed particulate mixture and fine particulates. The method may further include mixing the fine particulates with additional amounts of the particulate substrate, the hardness enhancer, the pigment and the liquid medium to form a second particulate mixture, heat treating the particulate mixture and the second particulate mixture, and mixing the particulate mixture and the second particulate mixture with a hydrophobic coating composition to form the hydrophobic exterior coating on the particulate mixture. The fine particulates may have a particle size sufficient to pass through a 40 mesh or smaller sieve. For example, in some embodiments, the fine particulates may have a particle size sufficient to pass through a 50 mesh sieve.

DETAILED DESCRIPTION

The reduction of heat transfer from the external environment to the interior working or living space of a building is becoming increasingly important as the cost of energy increases. In particular, while the interior space of a residence or building can generally be kept comfortable through the use of artificial cooling systems (e.g., HVAC systems), as energy costs rise, the cost of maintaining a comfortable working or living space also increases. Consequently, methods for reducing the transfer of heat from the external environment to the interior space of a building or residence are desirable.

Indeed, such a reduction of heat transfer would reduce the amount of time the artificial cooling systems would need to run to maintain a comfortable interior space, thereby reducing the amount of energy consumed by those cooling systems.

According to embodiments of the present invention, a particulate roofing material includes solar reflective granules or particulates, and the particulate roofing material has a bulk total solar reflectance (also referred to herein as "total solar reflectance" or simply "solar reflectance") of 70% or greater as measured using a reflectometer from Surface Optics Corporation (San Diego, Calif.). For example, the 410-Solar visible/NIR Portable Reflectometer from Surface Optics Corporation (San Diego, Calif.) may be used, which measures reflectance over 7 wavelength bands and uses an algorithm to calculate the total solar reflectance. In some embodiments, the particulate roofing material has a solar reflectance of at least 60%, for example, at least 70% or at least 80%. In some embodiments, the particulate roofing material may have a solar reflectance of at least 80%, and in some embodiments may have a total solar reflectance of at least 85%, or at least 90%. For example in some embodiments, the particulate roofing material may have a total solar reflectance of 90% or greater. For example, in some embodiments, the particulate roofing material has a solar reflectance of 60% to 95%, 70% to 95%, 80% to 95%, 70% to 90%, 80% to 90%, 85% to 95%, or 90% to 95%.

As discussed further below, the particulate roofing material may include a particulate mixture that is coated with a hydrophobic coating. In some embodiments, the coated particulate mixture may have the total solar reflectance values reported above, i.e., at least 60%, at least 70%, at least 80%, at least 85%, or at least 90%, etc. Additionally, in some embodiments, the uncoated particulate mixture (i.e., the particulate roofing material prior to coating with the hydrophobic coating discussed below, or the particulate roofing material without the hydrophobic exterior coating), may also have these total solar reflectance values. For example, in some embodiments, the uncoated particulate roofing material (or the particulate roofing material without the hydrophobic coating) may have a bulk total solar reflectance of 70% or greater as measured using a reflectometer from Surface Optics Corporation (San Diego, Calif.). In some embodiments, the uncoated particulate roofing material (or the particulate roofing material without the hydrophobic coating) may have a solar reflectance of at least 60%, for example, at least 70% or at least 80%. In some embodiments, the uncoated particulate roofing material (or the particulate roofing material without the hydrophobic coating) may have a solar reflectance of at least 80%, and in some embodiments may have a total solar reflectance of at least 85%, or at least 90%. For example in some embodiments, the uncoated particulate roofing material (or the particulate roofing material without the hydrophobic coating) may have a total solar reflectance of 90% or greater. For example, in some embodiments, the uncoated particulate roofing material has a solar reflectance of 60% to 95%, 70% to 95%, 80% to 95%, 70% to 90%, 80% to 90%, 85% to 95%, or 90% to 95%.

Additionally, the particulate roofing material (whether coated or uncoated) may have an ultraviolet light ("UV") reflectance (i.e., in the 335-380 nm wavelength band) of at least 20%, for example 20% to 80%. In some embodiments, the particulate roofing material (whether coated or uncoated) may have a UV reflectance of at least 25%, for example 25% to 75%, 25% to 70%, or 40% to 70%, as measured using a solar reflectometer from Surface Optics Corporation (San Diego, Calif.). For example, in some embodiments, the particulate roofing material (whether coated or uncoated) may have a UV reflectance of 50% or greater, for example, 50% to 70%, as measured using a solar reflectometer from Surface Optics Corporation (San Diego, Calif.).

In addition, the particulate roofing material (whether coated or uncoated) may have a visible light ("VIS") reflectance (i.e., in the 400-720 nm wavelength band) of at least 60%, for example 60% to 97%, or 60% to 95%, as measured using a solar reflectometer from Surface Optics Corporation (San Diego, Calif.). For example, in some embodiments, the particulate roofing material (whether coated or uncoated) may have a VIS reflectance of 70% or greater, for example, 70% to 98%, or 70% to 97%, as measured using a solar reflectometer from Surface Optics Corporation (San Diego, Calif.).

Also, the particulate roofing material (whether coated or uncoated) may have an infrared light ("IR") reflectance (i.e., in the 700-2500 nm wavelength band) of at least 60%, for example 60% to 98%, or 60% to 97%, as measured using a solar reflectometer from Surface Optics Corporation (San Diego, Calif.). For example, in some embodiments, the particulate roofing material (whether coated or uncoated) may have an IR reflectance of 70% or greater, for example, 70% to 98% or 70% to 97%, as measured using a solar reflectometer from Surface Optics Corporation (San Diego, Calif.).

As described above, the particulate roofing material according to embodiments of the present invention may have a total solar reflectance, UV reflectance, IR reflectance and/or VIS reflectance within the described ranges, whether the material is coated with the hydrophobic coating material, or the material is uncoated. In some embodiments, however, the uncoated particulate roofing material may have a total solar reflectance, UV reflectance, IR reflectance, and/or VIS reflectance different from the corresponding reflectance(s) of the coated counterpart material. For example, in some embodiments, the uncoated particulate roofing material may have a total solar reflectance, UV reflectance, IR reflectance, and/or VIS reflectance that is higher than the corresponding reflectance(s) of the coated counterpart material. As such, while the coated and uncoated versions of the particulate roofing material may both have a total solar reflectance, UV reflectance, IR reflectance, and/or VIS reflectance within the same ranges (as discussed above), the coated and uncoated versions of the material may have different reflectance values within the same ranges.

Additionally, in some embodiments, the particulate roofing material may have a bulk density of 40 lbs/ft$^3$ to 75 lbs/ft$^3$, for example 50 lbs/ft$^3$ to 75 lbs/ft$^3$, 40 lbs/ft$^3$ to 60 lbs/ft$^3$, 50 lbs/ft$^3$ to 60 lbs/ft$^3$, or 45 lbs/ft$^3$ to 60 lbs/ft$^3$. In some embodiments, the particulate roofing material may have a bulk density of 50 lbs/ft$^3$ to 60 lbs/ft$^3$, for example 52 lbs/ft$^3$ to 58 lbs/ft$^3$, or 53 lbs/ft$^3$ to 56 lbs/ft$^3$. The relatively low bulk density of the particulate roofing material enables significant cost savings. For example, the lower bulk density allows the application of fewer of the particulates (or granules) per unit area (or square) while still achieving the solar reflectance benefits (such as, for example, high total solar reflectance, and/or UV, VIS and/or IR reflectance).

As used herein, the term "particulate roofing material," and like terms, refer to solar reflective particulates or granules that are useful in so-called "cool roof" applications, and indeed, the term "particulate roofing material" is used interchangeably with the terms "solar reflective particulates," "solar reflective granules," "reflective particulates," "reflective granules," and like terms. Additionally, while the particulates and granules described herein are touted for their efficacy in "cool roof" applications, it is understood that the described particulates and granules may have other uses and applications, and that the described embodiments are not limited to use in "cool roof" applications. For example, in some embodiments, the particulate roofing materials described herein may be useful on any exterior surface, for example, as a filler in an exterior paint, or like application.

According to embodiments of the present invention, the reflective particulates or granules include a particulate (or granular) substrate or filler, a hardness (or processibility) enhancer, a pigment (or colorant), and a hydrophobic exterior coating. The substrate (or filler) may include any suitable particulate substrate, such as for example, a feldspar and/or a sand (such as, for example, a silica-based sand). Any suitable feldspar may be used in the particulate substrate (or filler). For example, in some embodiments, the feldspar may include an alkali feldspar, and/or a nepheline syenite. As used herein, the term "alkali feldspar" is used in its art-recognized sense, and refers to feldspar materials that are rich in one or more alkali elements, such as, for example lithium, potassium and/or sodium. In some embodiments, for example, the feldspar may include potassium feldspar, sodium feldspar, lithium feldspar, and/or nepheline syenite. For example, in some embodiments, the feldspar may include albite, anorthoclase, microcline, orthoclase, sanidine, and/or nepheline syenite. In some embodiments, for example, the feldspar may include nepheline syenite.

Additionally, any suitable sand may be used in the particulate substrate (or filler). Non-limiting examples of suitable sands include silica sand, zircon sand, olivine sand, lake sand, chromite sand, talc sand, and quartz sand. In some embodiments, for example, the sand may include a silica-based sand. As used herein, the term "silica-based sand" refers to particulate substrates that include silica as the primary constituent (i.e., silica is present in the sand in the largest quantity over any other ingredient). Also, in some embodiments, the silica-based sand includes a majority of silica, i.e., silica is present in the silica-based sand in an amount of 50% by weight or greater. While the silica-based sand includes silica as the primary constituent, the silica-based sand (as a component of the particulate substrate) may include secondary constituents. For example, in some embodiments, the silica-based sand may include one or more secondary oxides as the secondary constituent, non-limiting examples of which include trydimite and cristobalite (which are the mineral phases of silica, and can form upon heating or calcining the silica), $Al_2O_3$, $TiO_2$, CaO, MgO, $Na_2O$, $K_2O$, $Fe_2O_3$ and $P_2O_5$. In some embodiments, for example, the secondary constituent includes trydimite, cristobalite, and/or $Al_2O_3$, and in some embodiments the secondary constituent includes $Al_2O_3$ in addition to one or more other secondary oxides or other secondary constituents. In some embodiments, the secondary constituents may be present in the silica-based sand in an amount of less than 50% by weight, for example, 40% by weight or less. In some embodiments, for example, the silica-based sand may include silica in an amount 50% by weight or greater, alumina (i.e., $Al_2O_3$) in an amount of 20% by weight or greater, with other secondary constituents (e.g., trydimite, cristobalite, $TiO_2$, CaO, MgO, $Na_2O$, $K_2O$, $Fe_2O_3$ and/or $P_2O_5$) making up the remainder of the silica-based sand. In some embodiments, the silica-based sand (as a component of the particulate substrate) includes silica in an amount of 50% or greater, and one or more of trydimite and/or cristobalite as the secondary constituents making up the remainder of the silica-based sand. For example, in some embodiments, the silica-based sand includes a mixture of silica with one or more of trydimite and cristobalite as the secondary constituents, and in some embodiments, the silica-based sand includes a mixture of silica with both trydimite and cristobalite as the secondary constituents.

In some embodiments, the silica-based sand is opaque or semi-opaque in appearance. Also, in some embodiments, the silica-based sand has an angular to sub-rounded shape, for example an angular shape. The terms "angular" and "sub-rounded" as they relate to particle shape are terms of art known to those of ordinary skill in the art, and are used herein in their art-recognized senses. Indeed, the particle shapes referenced herein are as discussed in Rodriguez et al., "Particle Shape Quantities and Measurement Techniques—A Review," EJGE, vol. 18, Bund. A, pgs. 169-198 (2013), the entire contents of which are incorporated herein by reference. For example, an overview of different particle size descriptors can be found in Table 4 of Rodriguez at page 181, which is also specifically incorporated herein by reference.

Additionally, in some embodiments, the silica-based sand may have a Mohs hardness of 6 or greater. For example, in some embodiments, the silica-based sand has a Mohs hardness of 6 to 9, or 6 to 8. Also, the silica-based sand may have an average particle size of 5 to 200 microns, for example 5 to 150 microns, or 5 to 125 microns. In some embodiments, for example, the silica-based sand may include a sand in which 90% or more of the particles have a size 5 to 200 microns. For example, in some embodiments, the silica-based sand may include a sand in which 92% or more of the particles have a size of 5 to 200 microns. In some embodiments, for example, the silica-based sand may include a sand in which 90% to 95% of the particles have a size 5 to 200 microns.

Additionally, in some embodiments, the silica-based sand may include a sand in which 90% or more of the particles have a size of 5 to 150 microns. For example, in some embodiments, the silica-based sand may include a sand in which 92% or more of the particles have a size of 5 to 150 microns. In some embodiments, for example, the silica-based sand may include a sand in which 90% to 95% of the particles have a size 5 to 150 microns.

In some embodiments, for example, the silica-based sand may include a sand in which 90% or more of the particles have a size of 5 to 125 microns. For example, in some embodiments, the silica-based sand may include a sand in which 90% or more of the particles have a size of 5 to 125 microns. In some embodiments, for example, the silica-based sand may include a sand in which 90% to 95% of the particles have a size 5 to 125 microns.

According to some embodiments, the silica-based sand may have an average particle size of 10 to 200 microns, for example 10 to 150 microns, or 10 to 125 microns. In some embodiments, for example, the silica-based sand may include a sand in which 90% or more of the particles have a size 10 to 200 microns. For example, in some embodiments, the silica-based sand may include a sand in which 92% or more of the particles have a size of 10 to 200 microns. In some embodiments, for example, the silica-based sand may include a sand in which 90% to 95% of the particles have a size 10 to 200 microns.

Additionally, in some embodiments, the silica-based sand may include a sand in which 90% or more of the particles have a size of 10 to 150 microns. For example, in some embodiments, the silica-based sand may include a sand in which 92% or more of the particles have a size of 10 to 150 microns. In some embodiments, for example, the silica-based sand may include a sand in which 90% to 95% of the particles have a size 10 to 150 microns.

In some embodiments, for example, the silica-based sand may include a sand in which 90% or more of the particles have a size of 10 to 125 microns. For example, in some embodiments, the silica-based sand may include a sand in which 92% or more of the particles have a size of 10 to 125 microns. In some embodiments, for example, the silica-based sand may include a sand in which 90% to 95% of the particles have a size 10 to 125 microns.

In some embodiments, for example, the silica-based sand may include a sand in which 90% or more of the particles have a size of 5, 10, 15, 30, 40, 52, 63, 75, 106 or 125 microns. For example, in some embodiments, the silica-based sand may include a sand in which 92% or more of the particles have a size of 5, 10, 15, 30, 40, 52, 63, 75, 106 or 125 microns. In some embodiments, for example, the silica-based sand may include a sand in which 90% to 95% of the particles have a size 5, 10, 15, 30, 40, 52, 63, 75, 106 or 125 microns. The size of the particles of the silica-based sand may be measured by any suitable means or device, some nonlimiting examples of which include X-ray sedimentation methods (using, for example, the SEDIGRAPH® line of instruments available from Micromeritics Instrument Corporation (Norcross, Ga.) or similar instruments), or laser diffraction methods (using, for example, the MICROTRAC® line of instruments from Microtrac, Inc. (Montgomery, Pa.) or similar instruments). Some nonlimiting examples of suitable silica-based sands include the MIN-U-SIL® and SIL-CO-SIL® lines of products available from U.S. Silica (Frederick, Md.).

The particulate substrate (or filler) may be present in the reflective particulates in any suitable amount. For example, the particulate substrate (or filler) may be present in the reflective particulates in any amount so long as the resulting reflective particulates exhibit the desired properties, such as, for example, hardness, total solar reflectance, and/or UV, VIS or IR reflectance. In some embodiments, for example, the particulate substrate (or filler) may be present in the reflective particulates in an amount of about 15 wt % to about 65 wt %, for example, about 20 wt % to about 65 wt %, or about 40 wt % to about 65 wt %.

In embodiments in which the particulate substrate (or filler) includes both a feldspar and a sand (e.g., a silica-based sand), the feldspar and the sand may also be present in the reflective particulates in any suitable amounts. For example, in some such embodiments, the feldspar (e.g., nepheline syenite) may be present in the reflective particulates in an amount of about 20 wt % to about 60 wt %, for example, about 25 wt % to about 60 wt %, about 30 wt % to about 55 wt %, about 35 wt % to about 50 wt %, or 35 wt % to about 45 wt %. Additionally, in some embodiments, the sand (e.g., silica-based sand) may be present in the reflective particulates in an amount of about 3 wt % to about 20 wt %, for example, about 5 wt % to about 15 wt %, or about 7 wt % to about 12 wt %.

The hardness (or processibility) enhancer may be any suitable such enhancer that is capable of improving the hardness or processibility of the reflective particulates. Nonlimiting examples of the hardness (or processibility enhancer) include Plaster of Paris (i.e., $CaSO_4 \cdot \frac{1}{2}H_2O$), Hydrous gypsum (i.e., $CaSO_4 \cdot 2H_2O$), Epsom salt (i.e., $MgSO_4 \cdot 7H_2O$), aplite, calcium carbonate, magnesium carbonate, and sodium carbonate. In some embodiments, for example, the hardness (or processibility) enhancer may include Plaster of Paris. Any single hardness (or processibility) enhancer may be used, or a combination of different enhancers may be used.

The hardness (or processibility) enhancer may be present in the reflective particulates in an amount of about 10% by weight or greater, based on 100% by weight of the reflective particulates. For example, in some embodiments, the hardness (or processibility) enhancer may be present in the reflective particulates in an amount of about 15% by weight or greater, based on 100% by weight of the reflective particulates. In some embodiments, for example, the hardness (or processibility) enhancer may be present in the reflective particulates in an amount of about 10% by weight to about 30% by weight, or about 15% by weight to 25% by weight, based on 100% by weight of the reflective particulates. For example, in some embodiments, the hardness (or processibility) enhancer may be present in the reflective particulates in an amount of 15% by weight to about 21% by weight, based on the total weight of the reflective particulates.

The pigment (or colorant) may be any suitable pigment (or colorant) capable of imparting a reflective pigment (e.g., a white pigment) to the reflective particulates. For example, in some embodiments, the pigment (or colorant) may include any material that exhibits a total solar reflectance (on its own, i.e., outside of the reflective particulates) of 80% or greater. Nonlimiting examples of suitable pigments include transition metal oxides, clays, calcium silicates (e.g., wollastonite) and pyrophyllites. For example, in some embodiments, the pigment may include a transition metal oxide, a calcium silicate (e.g., wollastonite), a pyrophyllite and/or a kaolin clay. In some embodiments, for example, the pigment may include titanium dioxide, a pyrophyllite, a calcium silicate (e.g., wollastonite), a hydrous kaolin clay and/or a calcined kaolin clay. Nonlimiting examples of suitable pigments include calcium silicates (e.g., wollastonite), EPK kaolin (e.g., having an Fe content of about 0.93 wt %, where the reported Fe content is adjusted to exclude loss-on-ignition (LOI) and normalized to a total oxide content of 100%) available from Edgar Minerals (Edgar, Fla.), MCNAMEE® kaolin (e.g., having an Fe content of about 0.38 wt %, where the reported Fe content is adjusted to exclude LOI and normalized to a total oxide content of 100%) available from Vanderbilt Minerals, LLC (Norwalk, Conn.), Kingsley kaolin (e.g., having an Fe content of 0.45 wt %, where the reported Fe content is adjusted to exclude LOI and normalized to a total oxide content of 100%) available from Kentucky-Tennessee Clay Company (Roswell, Ga.), 6 TILE® kaolin (e.g., having an Fe content of about 0.4 wt %, where the reported Fe content is adjusted to exclude LOI and normalized to a total oxide content of 100%) available from Kentucky-Tennessee Clay Company (Roswell, Ga.), optiKasT kaolin (e.g., having an Fe content of about 0.58 wt %, where the reported Fe content is adjusted to exclude LOI and normalized to a total oxide content of 100%) available from Kentucky-Tennessee Clay Company (Roswell, Ga.), Ione Airfloated Kaolin (e.g., having an Fe content of about 0.7 wt %, where the reported Fe content is adjusted to exclude LOI and normalized to a total oxide content of 100%) available from Ione Minerals, Inc. (Ione, Calif.), the ASP® line of products (e.g., ASP G90, and ASP G92) available from BASF Corporation (Florham Park, N.J.), and the PYRAX® line of products (e.g., Pyrax HS) available from R.T. Vanderbilt Company, Inc. (Norwalk, Conn.).

In some embodiments, the pigment includes a clay-based pigment composition. As used herein, the term "clay-based pigment compositions" refers to pigment compositions that include clay (e.g., hydrous or calcined kaolin clay) as the primary component (i.e., clay is present in the pigment composition in the largest quantity over any other component). Also, in some embodiments, the clay-based pigment composition includes a majority of clay, i.e., clay is present in the clay-based pigment composition in an amount of 50% by weight or greater. In some embodiments, for example, the clay is present in the clay-based pigment composition in an amount of 60% by weight or greater, or 50% by weight to 80% by weight.

While the clay-based pigment composition includes clay (e.g., hydrous or calcined kaolin) as the primary component, the clay-based pigment composition may include secondary pigment components. For example, the secondary pigment components may include additional pigment materials, and/or pigment additives. Some nonlimiting examples of suitable secondary pigment components include metal and transition metal oxides (e.g., $TiO_2$, ZnO, SnO and various titanates), alkaline earth metal sulfates (e.g., $BaSO_4$, $MgSO_4$ (including anhydrous or hydrated forms, such as, e.g., Epsom salt) and the like), alkaline earth metal carbonates (e.g., $SrCO_3$ and $BaCO_3$), transition metal silicates (e.g., $ZrSiO_4$), metal silicates (e.g., alkaline earth metal silicates and alkali metal silicates, nonlimiting examples of which include $Ca_2SiO_4$, $Ba_2SiO_4$, magnesium silicate, and $ZrSiO_4$) and minerals (e.g., cristobalite). For example, in some embodiments, the secondary pigment component may include $TiO_2$, $BaSO_4$, ZnO, $ZrSiO_4$, $SrCO_3$, a metal silicate (e.g., an alkali metal silicate and/or an alkaline earth metal silicate), and/or cristobalite. In some embodiments, for example, the clay-based pigment composition may include the clay (e.g., hydrous or calcined kaolin) in an amount of 50% by weight or greater, with the remainder of the composition being one or more of $TiO_2$, $BaSO_4$, ZnO, $ZrSiO_4$, $SrCO_3$, a metal silicate (e.g., an alkali metal silicate and/or an alkaline earth metal silicate), and/or cristobalite. In some embodiments, for example, the clay-based pigment composition may include the clay (e.g., hydrous or calcined kaolin) in an amount of 50% by weight or greater, with the remainder of the composition being one or more of Epsom salt, $BaSO_4$, $SrCO_3$, $BaCO_3$, $ZrSiO_4$, $Ca_2SiO_4$, $Ba_2SiO_4$, magnesium silicate, SnO and/or ZnO.

For example, the secondary pigment components may be present in the clay-based pigment composition in an amount of less than 50% by weight. In some embodiments, for example, the secondary pigment components are present in the clay-based pigment composition in a positive amount (i.e., greater than 0% by weight) up to 49% by weight. For example, in some embodiments, the secondary pigment components may be present in the clay-based pigment composition in an amount of 1% by weight to 40% by weight%, 5% by weight to 30% by weight, or 10% by weight to 25% by weight. For example, when a secondary pigment is present, the primary pigment (whether clay-based or not clay-based (such as, for example, a transition metal oxide)) and the secondary pigment components may be present in the pigment in a weight ratio of 70:30 to 90:10, for example 75:25 to 90:10, or 80:20 to 90:10.

To impart a non-white pigment to the reflective particulates, or to provide other beneficial properties, the pigment (or clay-based pigment composition) may include a pigment additive, such as a non-white additive, an anti-microbial additive, a reflectivity additive, etc. Suitable such additives (e.g., non-white additives) include transition metal sulfates, transition metal nitrates, and various pigments available from Ferro Corporation, Mayfield Heights, Ohio (e.g., the pigments sold under the trade names GEODE®, COOL COLORS® and ECLIPSE®). For example, in some embodiments, the additive may include $CuSO_4$, $AgNO_3$, and/or a pigment available from Ferro Corporation. In the clay-based pigment composition, the additive may be included as one of the secondary pigment components of the clay-based pigment composition, and may be included in the amounts described above in connection with the secondary pigment components.

Some nonlimiting examples of suitable secondary pigment components and pigment additives include the ALTIRIS® line of pigments (e.g., ALTIRIS® 550 pigment and ALTIRIS® 800 pigment) available from Huntsman (Stockton-On-Tees, United Kingdom), the Ti-PURE® line of titanium dioxide pigments (e.g., Ti-PURE® R-900 or Ti-Pure® R-960) available from E.I. du Pont de Nemours and Company (Wilmington, Del.), the TYZOR® line of organic titanates (e.g., TYZOR® 217) also available from E.I. du Pont de Nemours and Company (Wilmington, Del.), the TYZOR® line of organic titanates and zirconates (e.g., TYZOR® TE (an organic titanate) and TYZOR® TEAZ (an organic zirconate)) available from Dorf Ketal Chemicals Pvt. Ltd. (Maharashtra, India).

The pigment (i.e., the pigment composition as a whole including the clay and any pigment additives) may be present in the reflective particulates in an amount of 45% by weight or less, based on 100% by weight of the reflective particulates. For example, in some embodiments, the pigment may be present in the reflective particulates in an amount of 40% by weight or less, based on 100% by weight of the reflective particulates. In some embodiments, for example, the pigment may be present in the reflective particulates in an amount of 10% by weight to 45% by weight, or 10% by weight to 40% by weight, based on 100% by weight of the reflective particulates. Also, in some embodiments, the clay may be present in the reflective particulates in an amount of 5% by weight to 40% by weight, based on the total weight of the reflective particulates. In some embodiments, for example, the clay may be present in the reflective particulates in an amount of 10% by weight to 35% by weight, 15% by weight to 30% by weight, 10% by weight to 30% by weight, or 15% by weight to 25% by weight, based on the total weight of the reflective particulates. Additionally, the secondary pigment components (e.g., Epsom salt, $BaSO_4$ and/or ZnO) may be present in the reflective particulates in an amount of 1% by weight to 15% by weight, based on the total weight of the reflective particulates. In some embodiments, for example, the secondary pigment components may be present in the reflective particulates in an amount of 1% by weight to 10% by weight, 1% by weight to 8% by weight, 2% by weight to 8% by weight, or 2% by weight to 7% by weight, based on the total weight of the reflective particulates.

Further, in embodiments including a mixture or combination of two or more secondary pigment components, the two secondary pigment components may be present in the reflective particulates in any suitable amounts and any suitable weight ratios. For example, in some embodiments including $BaSO_4$ and ZnO as the secondary pigment components, the reflective particulates may include a greater amount of the $BaSO_4$ than the ZnO. In some embodiments, for example, the $BaSO_4$ may be present in the reflective particulates in an amount that is about 10% to 30% greater than the amount of the ZnO in the reflective particulates, for example an amount that is about 15% to 20% greater than the amount of the ZnO in the reflective particulates. In some embodiments, for example, the $BaSO_4$ may be present in the reflective particulates in an amount of about 1 wt % to about 5 wt %, while the ZnO may be present in amount of about 1 wt % to about 4 wt %. For example, in some embodiments, the $BaSO_4$ may be present in the reflective particulates in an amount of about 2 wt % to about 4 wt %, while the ZnO may be present in the reflective particulates in an amount of about 1 wt % to about 3 wt %.

In some embodiments, as discussed above, the pigment includes a clay. In embodiments of the reflective particulates in which the particulate substrate (or filler) includes a feldspar (e.g., nepheline syenite), and the pigment includes a clay (e.g., hydrous kaolin), the feldspar may be present in the reflective particulates in an amount greater than the amount of the clay. For example, in some embodiments, the feldspar and the clay may be present in the reflective particulates in a weight ratio of 40:60 to 90:10, for example, 45:55 to 85:15, 60:30 to 90:10, or 60:30 to 85:15. Additionally, the feldspar and the clay may be present in the reflective particulates in a total combined amount of about 50 wt % to about 75 wt %, for example about 50 wt % to about 70 wt %, or about 55 wt % to about 70 wt %. For example, in some embodiments, the feldspar and the clay may be present in the reflective particulates in a total combined amount of about 65 wt %.

The hydrophobic exterior coating provides weather and UV resistance to the reflective particulates, and is formed from a coating composition. The coating composition may include any material suitable for coating the reflective particulates with a hydrophobic coating. Some non-limiting example so suitable materials for the hydrophobic coating including silanes, siloxanes, polysiloxanes, organo-polysiloxanes, and silicone resins. In some embodiments, for example, the hydrophobic exterior coating may include a silane and/or siloxane. Any suitable silane and/or siloxane may be used for the hydrophobic coating. For example, in some embodiments, hydrophobic coating may include an alkyl and/or alkoxy functional silane or siloxane. For example, in some embodiments, the hydrophobic coating may include a material selected from alkyl silanes, alkyl siloxanes, alkoxy silanes, alkoxy siloxanes, functionalized alkoxy silanes, functionalized alkyl silanes, functionalized alkoxy siloxanes, and/or functionalized alkyl siloxanes. The functional groups in the functionalized silanes and siloxanes may be any suitable functional groups, including (but not limited to) alkyl groups (linear or branched), amino groups, halogen-containing groups (e.g., fluoro-containing groups, such as, for example, fluoroalkyl groups) and glycol groups. Additionally, in some embodiments, the hydrophobic coating may include a water-borne and/or sol-gel based silane or siloxane.

For example in some embodiments, the hydrophobic coating may include a silane compound represented by Formula 1.

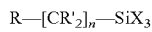

$$R-[CR'_2]_n-SiX_3 \quad \text{Formula 1}$$

In Formula 1, R is a functionalized organic group, R' is H or a C1 to C5 alkyl group, n is an integer of 1 to 10, and X is a hydrolyzable group (e.g., a hydroxy group, or an alkoxy group). In Formula 1, geminal and vicinal R' groups may be the same or different. According to some embodiments, the organic group may include a functionalized alkyl or cycloalkyl group in which the functional group may include an amino group, a nitrogen-containing group, an epoxy group, a hydroxy group, or other suitable functional groups capable of reacting with the polymer.

Nonlimiting examples of suitable compounds for the hydrophobic exterior coating include bis(2-hydroxyethyl)-3-amino-propyltriethoxysilane, 3-aminopropyl-triethoxysilane, 3-ureidopropyltriethoxysilane, N-(2-amino-ethyl)-3-aminopropyltrimethoxysilane, 3-aminopropyl-triethoxysilane, tri-methoxysilylpropyl-diethylenetriamine, 2-(3,4-epoxycyclohexyl)ethyltri-methoxysilane, and 3-glycidoxypropylthri-methoxysilane. In some embodiments, for example, the hydrophobic coating may include a material selected from N(beta-aminoethyl) gamma-aminopropyl trimethoxy silane, polyethyleneglycol-functional alkoxysilanes, oligomeric short-chain alkylfunctional silanes, modified fluoroalkyl siloxanes, propyltriethoxysilane, and/or the like. A single material may be used for the hydrophobic coating, or a combination of two or more materials may be used. Some nonlimiting examples of suitable materials for the hydrophobic coating include the SILRES® line of products (e.g., the SILRES® BS line of products, for example SILRES® BS 3003) available from Wacker Chemie AG (Munich, Germany), the DYNASYLAN® line of silanes and siloxanes (e.g., DYNASYLAN® SIVO 112, DYNASYLAN® SIVO 113, DYNASYLAN® SIVO 110, DYNASYLAN® PTEO, DYNASYLAN® F 8815, DYNASYLAN® 9896 and DYNASYLAN® 4148) available from Evonik Industries AG (Essen, Germany), and the SILQUEST® line of silanes and siloxanes (e.g., SILQUEST® A-1120, SILQUEST® A-1630A and SILQUEST® A-137) available from Momentive Performance Materials, Inc. (Waterford, N.Y.). A single compounds (or products) may be used for the hydrophobic coating, or a combination of two or more compounds (or products) may be used.

The amount of the hydrophobic exterior coating may be selected in order to alleviate excess dusting, and to prevent or reduce the amount of agglomeration. For example, if the hydrophobic coating is present in an amount that is too low, the resulting roofing particulate may exhibit excess dusting. Conversely, if the hydrophobic exterior coating is present in an amount that is too high, the resulting roofing particulate may exhibit excess agglomeration. In some embodiments, for example, the hydrophobic exterior coating may make up 5 wt % or less of the roofing particulate (i.e., the total weight of the substrate (or filler), hardness (or processibility enhancer), pigment (colorant), hydrophobic exterior coating, etc.). For example, in some embodiments, the hydrophobic exterior coating makes up 3 wt % or less of the roofing particulate. In some embodiments, the hydrophobic exterior coating makes up 2 wt % or less, or 1.5 wt % to 2 wt %.

While the hydrophobic coating provides weather and UV resistance, the hydrophobic coating also decreases the total solar reflectance of the reflective particulate. Accordingly, in some embodiments, the underlying pigmented particulate (i.e., the mixture of the substrate (or filler), the hardness (or processibility) enhancer, and the pigment (or colorant) has a total solar reflectance of 80% or higher. When the underlying pigmented particulate has a total solar reflectance within this range, the reflective particulate (i.e., the pigmented particulate coated with the hydrophobic exterior coating) maintains a suitable total solar reflectance despite the decrease in total solar reflectance caused by application of the hydrophobic coating. Indeed, in some embodiments, the hydrophobic coating may decrease the total solar reflectance of the underlying pigmented particulate by up to 5%, for example, from 1% to 5% or 2% to 4%. Consequently, in some embodiments, the pigmented particulate (i.e., prior to application of the hydrophobic coating) may have a total solar reflectance of 80% to 95%, for example 85% to 95%, 85% to 94%, 85% to 93%, 90% to 95%, or 90% to 93%.

The compositions according to embodiments of the present invention exhibit improved total solar reflectance, as well as UV, VIS and IR reflectance. These improved reflectance properties can be attributed to a number of factors, including the oxide distribution in the final products (i.e., in the reflective particulates before and after calcining, and before and after addition of the hydrophobic coating). For example, at any stage (i.e., before or after calcining, or before or after addition of the hydrophobic coating), the compositions according to embodiments of the present invention have low iron and titanium oxide contents. Iron contributes to the color of the material (i.e., products with higher iron oxide content appear more yellow), while titanium dioxide has a negative effect on UV reflectance. For example, $TiO_2$ by itself typically exhibits a UV reflectance of about 10%, and when combined in certain amounts with certain amounts of other materials, the UV reflectance drops even further. Indeed, when combined in certain amounts with certain amounts of a clay, the $TiO_2$ can reduce the UV reflectance from 10% to over 30%. According to some embodiments of the present invention, the reflective particulates at any stage (i.e., before or after calcining, or before or after addition of the hydrophobic coating) have an iron oxide (i.e., $Fe_2O_3$) content of 0.50 wt % or less, for example, less than 0.40 wt %, or less than 0.30 wt %. In some embodiments, for example, the reflective particulates at any stage (i.e., before or after calcining, or before or after addition of the hydrophobic coating) have an iron oxide content of a positive amount (i.e., greater than 0 wt %) to about 0.50 wt %, or a positive amount to about 0.40 wt %, for example a positive amount to about 0.30 wt %. Additionally, in some embodiments, the reflective particulates at any stage (i.e., before or after calcining, or before or after addition of the hydrophobic coating) have a titanium dioxide content of less than 0.30 wt %, for example less than 0.25 wt %, less than 0.20 wt %, or less than 0.15 wt %. In some embodiments, for example, the reflective particulates at any stage (i.e., before or after calcining, or before or after addition of the hydrophobic coating) have a titanium dioxide content of a positive amount (i.e., greater than 0 wt %) to less than 0.30 wt %, or a positive amount to about 0.25 wt %, for example, a positive amount to about 0.20 wt %, or a positive amount to about 0.15 wt %.

In addition, the reflective particulates according to some embodiments of the present invention at any stage (i.e., before or after calcining, or before or after addition of the hydrophobic coating) have an aluminum oxide (i.e., $Al_2O_3$) content of less than 40 wt %, for example, less than 30 wt %, less than 20 wt %, or less than 19 wt %. For example in some embodiments, the reflective particulates at any stage (i.e., before or after calcining, or before or after addition of the hydrophobic coating) have an aluminum oxide content of a positive amount (i.e., greater than 0 wt %) to less than 40 wt %, or a positive amount to less than 30 wt %, for example, a positive amount to less than 20 wt %, or a positive amount to less than 19 wt %. For example, in some embodiments, the reflective particulates at any stage (i.e., before or after calcining, or before or after addition of the hydrophobic coating) have an aluminum oxide content of a positive amount (i.e., greater than 0 wt %) to about 18 wt %.

The reflective particulates according to embodiments of the present invention may include certain other oxides. As used herein, the term "other oxides" in this context refers to all oxides other than $SiO_2$, $Al_2O_3$, $Fe_2O_3$ and $TiO_2$. For example, the "other oxides" may include CaO, MgO, $Na_2O$ and/or $K_2O$ as well as ZnO and/or BaO. Additionally, $P_2O_5$, $Ga_2O_3$, $Li_2O$, $Rb_2O$, SrO, ZrO and/or $SO_3$ may be present in the "other oxides." These other oxides may be present to varying degrees in the reflective particulates. For example, in some embodiments, these other oxides may be present in the reflective particulates at any stage in a total amount of about 12 wt % to 30 wt %, for example about 15 wt % to 30 wt %, or about 15 wt % to about 25%. In some embodiments, for example, CaO may be present in the reflective particulates at any stage in an amount of about 0.1 wt % to about 12 wt %, for example, about 0.2 wt % to about 11 wt %, or about 0.2 wt % to about 10.5 wt %. Additionally, MgO may be present in the reflective particulates at any stage in an amount of about 0.01 wt % to about 12 wt %, for example, about 0.02 wt % to about 11 wt %, or about 0.02 wt % to about 10.5 wt %. Also, $Na_2O$ may be present in the reflective particulates at any stage in an amount of about 0.1 wt % to about 17 wt %, for example, about 0.1 wt % to about 16 wt %, or about 0.2 wt % to about 16 wt %. In addition, $K_2O$ may be present in the reflective particulates at any stage in an amount of about 0.05 wt % to about 6 wt %, for example, about 0.05 wt % to about 5 wt %, or about 0.1 wt % to about 4.5 wt %. In addition, BaO may be present in the reflective particulates at any stage in an amount of about 0 wt % to about 5 wt %, for example, about 1 wt % to about 5 wt %, or about 2 wt % to about 4 wt %. The ZnO (discussed above as a potential secondary pigment component) may be present in the reflective particulates at any stage in an amount of about 0.01 wt % to about 4 wt %, for example, about 0.02 wt % to about 4 wt %, or about 0.03 wt % to about 3 wt %.

In some embodiments, the reflective particulates have a Mohs hardness or 6 to 7, for example 6. Additionally, the reflective particulates may register an average Vickers hardness of 700 to 900, for example 750 to 850, with a standard deviation of about 60 to about 100, for example about 70 to about 90 or about 80 to about 90. As used herein, the "Vickers hardness" values are those values obtained by indentation testing performed according to ASTM E2546-07 at a maximum force of 25 mN using a Nano Hardness Tester "NHT" from CSM Instruments, serial number 6-135 with module serial number 080820, and software "Indentation" version 3.81.05.

According to embodiments of the present invention, a method of preparing the reflective particulates (or reflective granules, or reflective particulate compositions) includes mixing the particulate substrate (or filler), the hardness (or processibility) enhancer, and the pigment to form a substantially homogeneous mixture. As used herein, the term "substantially" is used as a term of approximation, and not as term of degree, and is intended to account for the inherent deviations and variations in measured, observed or calculated properties or values. Accordingly, the term "substantially homogeneous" denotes that the while the mixture may not be perfectly homogeneous, the mixture would be considered homogeneous by those of ordinary skill in the art. The method further includes adding a liquid media (e.g., water) to the mixture of components until a desired consistency is achieved. The desired consistency at this stage of the process may vary depending on a variety of factors, e.g., whether the composition is desired to be ultimately moldable or flowable. In some embodiments, however, the liquid media may be added to mixture in an amount of about 20 wt % to about 50 wt %, or about 30 wt % to about 40 wt %. For example, in some embodiments in which the composition is desired to be moldable, the liquid media may be added to the mixture in an amount of about 20 wt % to about 40 wt %, for example, about 25 wt % to about 35 wt %, or about 30 wt %. In some embodiments in which the composition is desired to be flowable, the liquid media may be added to the mixture in an amount of about 30 wt % to about 50 wt %, for example about 35 wt % to about 45 wt %, or about 40 wt %.

The method may further include extruding the wet mixture (i.e., the mixture of particulates and the liquid media), or pouring the wet mixture into molds, and then drying the extruded or molded product. The drying may be performed at any suitable temperature to substantially drive off the liquid media. As discussed above, as used herein, the term "substantially" is a term of approximation, and not a term of degree, and the phrase "substantially drive off the liquid media" is intended to account for inherent deviations in the measurement, calculation or observation of the amount of the liquid media remaining in the mixture after drying. For example, the liquid media would be considered substantially driven off if the amount of liquid media remaining in the mixture is either not detectable or is otherwise negligible, as would be understood by those of ordinary skill in the art.

The temperature for drying the wet mixture is not particularly limited, and may vary depending on the liquid media selected. However, the temperature should be high enough to substantially drive off the liquid media, but not high enough to constitute a heat treatment or calcining procedure. For example, drying may be performed at a temperature of about 100° C. to about 800° C., for example about 100° C. to about 700° C., about 120° C. to about 160° C., or about 130° C. to about 150° C. Additionally, the time needed to dry the wet mixture is not particularly limited, and may vary depending on the consistency of the wet mixture, the liquid media used in the wet mixture, the temperature used to perform the drying, and the amount of the liquid media in the wet mixture. In some embodiments, drying is performed for about 10 minutes to about 90 minutes, for example about 20 minutes to about 70 minutes, or about 30 minutes to about 60 minutes.

The dried mixture may then be crushed and/or calcined (or subjected to heat treatment). In embodiments in which the dried mixture is both crushed and calcined, the dried mixture may either be crushed first and then calcined, or calcined first, and then crushed. Indeed, in some embodiments, the dried mixture may first be crushed (i.e., prior to calcining) to the desired particle size. This pre-crushing allows any fine materials (or fine particulates) to be re-introduced into the product feed, thereby reducing the amount of waste material generated by the process. The hardness (or processibility) enhancer (e.g., Plaster of Paris and/or Epsom Salt) in the reflective particulates helps enable this property. In particular, in some embodiments that include smaller amounts of the hardness (or processibility) enhancer (or none of the enhancer), the mixtures may generate finer particles when hand-crushed. The fine particles generated during the crushing process may be recycled by reintroducing them into the production feed. However, because of their smaller particle size, the amount of the liquid media needed to reach the desired consistency of the wet mixture may be increased. In some embodiments, the recycled fine particles may be added to the production feed in amount of about 25 wt % of the feed or less.

In some embodiments in which the fine particulates generated during the crushing process are recycled into the production feed, the method may include mixing the particulate substrate (or filler), the hardness (or processibility) enhancer, the pigment and a liquid medium to form a particulate mixture. This method further includes drying the particulate mixture at a temperature up to about 800° C. to form a dried particulate mixture, and crushing the dried particulate mixture to form a crushed particulate mixture and the fine particulates. As used herein, the term "fine" in describing the fine particulates refers to the particle size of the particulates, and denotes a particle size that is sufficient to pass through 40 mesh or smaller sieve. For example, in some embodiments, the "fine" particulates may have a particle size sufficient to pass through a 40 mesh or a 50 mesh sieve.

The method may further include reintroducing the fine particulates into the production feed by mixing the fine particulates with additional amounts of the particulate substrate, the hardness enhancer, the pigment and the liquid medium to form a second particulate mixture. The method may also further include heat treating the particulate mixture and the second particulate mixture, and mixing the particulate mixture and the second particulate mixture with a hydrophobic coating composition to form the hydrophobic exterior coating on the particulate mixture.

As discussed above, according to embodiments of the present invention, the dried mixture may be calcined either before or after crushing. The calcining process may be performed at any suitable temperature and for any suitable length of time. For example, in some embodiments, the dried mixture (either before or after crushing) may be calcined (or fired) at a temperature of about 1000° C. to about 1200° C., for example about 1025° C. to about 1200° C., or about 1025° C. to about 1170° C. Additionally, in some embodiments, the dried mixture may be calcined (or fired) for about 10 minutes to about 60 minutes, for example about 20 minutes to about 50 minutes, about 20 minutes to about 40 minutes, or about 30 minutes.

After crushing and/or calcining, the fired mixture is then coated with the hydrophobic coating. To apply the hydrophobic coating, the material of the coating (e.g., a silane or siloxane material) is added to the fired mixture, and the resulting coated mixture is mixed until substantially homogeneous. In some embodiments, the material of the hydrophobic coating (e.g., a silane or siloxane) may first be diluted with a liquid diluting media (e.g., water). The amount of the liquid diluting media is not particularly limited, and will depend on the material used for the hydrophobic coating. However, the amount of the liquid diluting media should be sufficient to achieve a viscosity and consistency of the coating liquid mixture that is sufficient to coat the particulates to the desired degree. For example, in some embodiments, the coating liquid mixture may include the coating material (e.g., a silane or siloxane) and the liquid media (e.g., water) in a weight ratio of about 1:3 to about 1:7, or about 1:5.

The material of the hydrophobic coating (e.g., a silane or siloxane) may be added to the fired mixture in any suitable amount. In some embodiments, for example, the material of the hydrophobic coating is added to the fired mixture in an amount of about 0.3 wt % to about 2 wt % (dry weight) based on 100 wt % of the fired mixture. For example, in some embodiments, the material of the hydrophobic coating is added to the fired mixture in an amount of about 0.5 wt % to about 1.5 wt %, about 0.7 wt % to about 1.2 wt %, or about 1 wt %, based on 100 wt % of the fired mixture.

Additionally, in its liquid form, the liquid coating mixture may be added to the uncoated fired particulate mixture in any amount suitable to effect proper or sufficient coating of the particulates. For example, in some embodiments, the liquid mixture may be added to the uncoated fired particulates in an amount of about 5 wt % to about 20 wt %, for example about 7 wt % to about 15 wt %, or about 10 wt % based on 100 wt % of the uncoated fired particulates.

The coated mixture is then dried to substantially drive off or remove the liquid diluting media and cure the coating. The temperature and length of this drying process are not particularly limited. However, the temperature and length of the drying process should be sufficient to substantially drive off the liquid media. For example, drying may be performed at a temperature of about 100° C. to about 200° C., for example about 120° C. to about 160° C., or about 130° C. to about 150° C. Additionally, in some embodiments, the drying may be performed for about 10 minutes to about 90 minutes, for example about 20 minutes to about 70 minutes, or about 30 minutes to about 60 minutes. The resulting product may then be filtered or screened to remove fines (i.e., fine particulates) and achieve the desired particle size and particle size distribution. Any suitable filtering and screening process may be used for this purpose, which processes are known to those of ordinary skill in the art.

As noted above, in some embodiments of the method, the particulate materials may be wetted with a liquid medium during the initial mixing, and the hydrophobic coating may be diluted with a liquid diluting media. Any suitable liquid medium may be used as the liquid media and liquid diluting media, including, but not limited to aqueous media (for example, water), organic solvents and mixtures thereof (such as, for example, dilute alcohols). However, in some embodiments, an aqueous media is used, and in some embodiments, the aqueous media is water. Although organic solvents and organic/aqueous mixtures may be used, these media contribute volatile organic components (VOC), and are therefore less desirable in large scale operations for environmental and safety reasons.

When used, the liquid media is present in the mixture of particulates in an amount corresponding to the water demand of the particulates. As used herein, the "water demand of the substrate" is used in its art-recognized sense to refer to the fractional amount of water required to yield a specified consistency or workability of the substrate mixture. As would be understood by those of ordinary skill in the art, the amount of water or liquid media required to meet the "water demand of the substrate" may vary depending on the type of substrate used, and on the particle size or particle size distribution of the substrate. In any event, when used, the liquid media (e.g., water) is driven off after the initial mixing during the drying and/or subsequent heat treatment (or calcining).

In the methods according to embodiments of the present invention, the mixing can be performed in any suitable manner and using any suitable machinery. In some embodiments, for example, the mixing is performed using a cement mixer, a drum mixer, a disc mixer, a pin mixer, a ribbon-paddle blender, a planetary mixer, a double cone blender, a V blender, a vertical blender or a screw-auger mixer.

EXAMPLES

The following Examples and Comparative Examples are presented for illustrative purposes only, and do not limit the scope of any of the embodiments described herein.

Examples 1-4

Nepheline syenite, kaolin clay (ASP® G90 obtained from BASF Corporation (Florham Park, N.J.), Plaster of Paris, silica (MIN-U-SIL® 10 obtained from U.S. Silica (Frederick, Md.), $BaSO_4$ and ZnO were mixed in the amounts shown in Table 1. Water was then added to each mixture to the water demand level of the mixture. Each wetted mixture was then dried in an oven at a temperature of about 150° C. for about 30 minutes to substantially remove the water. Each dried mixture was then crushed followed by calcining at the temperature listed in Table 1 and for the length of time listed in Table 1.

TABLE 1

|  | Example 1 | Example 2 | Example 3 | Example 4 |
|---|---|---|---|---|
| Nepheline Syenite (wt %) | 40.2 | 40.0 | 40.0 | 40.0 |
| Kaolin (ASP ® G90) (wt %) | 20.1 | 30.0 | 35.0 | 25.0 |
| Plaster of Paris (wt %) | 17.1 | 19.0 | 19.0 | 19.0 |
| Silica (MIN-U-SIL ® 10) (wt %) | 17.1 | 5.0 | 0.00 | 10.0 |
| BaSO4 (wt %) | 2.76 | 3.25 | 3.25 | 3.25 |
| ZnO (wt %) | 2.76 | 2.75 | 2.75 | 2.75 |
| Firing (calcining) temp. (° C.) | 1150 | 1150 | 1150 | 1150 |
| Firing (calcining) time (minutes) | 10 | 15 | 15 | 15-30 |

The total solar reflectance (TSR) as well as the UV, VIS and IR reflectance of each of the uncoated calcined mixtures were evaluated, and the results are shown in Table 2. Additionally, each of the uncoated calcined mixtures were then coated with the same hydrophobic coating. Specifically, a silane (SILRES® BS 3003 obtained from Wacker Chemie AG (Munich, Germany)) was diluted with water to a 1:5 weight ratio of silane to water, and the diluted solution was added to the mixture in an amount of 10 wt % of the silane component based on 100 wt % of the uncoated calcined mixture. The coated mixture was then dried at about 150° C. for about 30 minutes to substantially remove the water. The dried coated material was then screened to the desired particle size. The total solar reflectance (TSR) as well as the UV, VIS and IR reflectance of each of the hydrophobically coated calcined mixtures were evaluated, and the results are shown in Table 2.

TABLE 2

|  | Ex. 1 uncoated | Ex. 1 coated | Ex. 2 uncoated | Ex. 2 coated | Ex. 3 uncoated | Ex. 3 coated | Ex. 4 uncoated | Ex. 4 coated |
|---|---|---|---|---|---|---|---|---|
| UV (335-380 nm)(%) | 60.0 | 59.1 | 58.8 | 58.6 | 56.6 | 58.7 | 63.7 | 61.9 |
| VIS (400-540 nm)(%) | 85.6 | 85.5 | 83.9 | 85.3 | 83.1 | 84.0 | 87.4 | 86.2 |
| VIS (480-600 nm)(%) | 89.6 | 89.4 | 89.2 | 90.7 | 88.9 | 89.5 | 91.6 | 90.1 |
| VIS (590-720 nm)(%) | 91.7 | 91.4 | 92.6 | 93.6 | 92.7 | 92.7 | 93.8 | 91.8 |
| IR (700-1100 nm)(%) | 93.5 | 93.1 | 95.4 | 95.7 | 95.8 | 94.8 | 96.0 | 93.4 |
| IR (1000-1700 nm)(%) | 93.3 | 92.5 | 95.1 | 94.9 | 95.2 | 93.3 | 95.6 | 92.7 |
| IR (1700-2500 nm)(%) | 92.2 | 90.1 | 94.2 | 90.9 | 94.4 | 87.6 | 94.0 | 89.2 |
| TSR (%) | 90.1 | 89.5 | 90.7 | 91.2 | 90.6 | 90.0 | 92.3 | 90.0 |

As can be seen in Table 2, reflective particulates according to embodiments of the present invention exhibit good total solar reflectance, as well as good UV, VIS and IR reflectance both before and after addition of the hydrophobic coating.

Examples 5-9

Uncoated particulates were prepared as in Examples 1-4, except that the amounts of the nepheline syenite, kaolin clay (ASP® G90 obtained from BASF Corporation (Florham Park, N.J.), Plaster of Paris, silica (MIN-U-SIL® 10 obtained from U.S. Silica (Frederick, Md.), $BaSO_4$ and ZnO were as indicated in Table 3. Additionally, the firing (or calcining) temperature and length of firing (or calcining) for each of the particulate mixtures were as indicated in Table 3.

TABLE 3

|  | Ex. 5 | Ex. 6 | Ex. 7 | Ex. 8 | Ex. 9 |
|---|---|---|---|---|---|
| Nepheline Syenite (wt %) | 30.0 | 35.0 | 45.0 | 50.0 | 55.0 |
| Kaolin (ASP ® G90) (wt %) | 35.0 | 30.0 | 20.0 | 15.0 | 10.0 |
| Plaster of Paris (wt %) | 19.0 | 19.0 | 19.0 | 19.0 | 19.0 |
| Silica (MIN-U-SIL ® 10) (wt %) | 10.0 | 10.0 | 10.0 | 10.0 | 10.0 |
| BaSO4 (wt %) | 3.25 | 3.25 | 3.25 | 3.25 | 3.25 |
| ZnO (wt %) | 2.75 | 2.75 | 2.75 | 2.75 | 2.75 |
| Firing (calcining) temp. (° C.) | 1125 | 1125 | 1125 | 1125 | 1125 |
| Firing (calcining) time (minutes) | 15-30 | 15-30 | 15-30 | 15-30 | 15-30 |
| Bulk Density (lbs/ft$^3$) | 53.3 | 54.3 | 54.3 | 59.5 | 69.4 |

The total solar reflectance (TSR) as well as the UV, VIS and IR reflectance of each of the uncoated calcined mixtures were evaluated, and the results are shown in Table 4.

TABLE 4

|  | Example 5 | Example 6 | Example 7 | Example 8 | Example 9 |
|---|---|---|---|---|---|
| UV (335-380 nm) (%) | 58.6 | 62.4 | 66.7 | 63.4 | 56.8 |
| VIS (400-540 nm) (%) | 83.7 | 85.7 | 88.9 | 86.6 | 85.0 |
| VIS (480-600 nm) (%) | 88.3 | 90.3 | 92.8 | 90.0 | 88.3 |
| VIS (590-720 nm) (%) | 92.3 | 93.3 | 94.8 | 91.6 | 89.3 |
| IR (700-1100 nm) (%) | 95.7 | 96.1 | 96.7 | 93.3 | 90.0 |
| IR (1000-1700 nm) (%) | 95.3 | 95.4 | 95.4 | 91.4 | 87.5 |
| IR (1700-2500 nm) (%) | 93.5 | 93.0 | 88.1 | 82.0 | 77.7 |
| TSR (%) | 90.6 | 91.6 | 92.8 | 89.5 | 86.5 |

As can be seen in Table 4, reflective particulates according to embodiments of the present invention exhibit good total solar reflectance, as well as good UV, VIS and IR reflectance with varying amounts of the particulate substrate and pigment.

Examples 10-12

For Examples 10-11, uncoated particulates were prepared as in Examples 1-4, except that the amounts of the nepheline syenite, kaolin clay (ASP® G90 obtained from BASF Corporation (Florham Park, N.J.), Plaster of Paris, silica (MIN-U-SIL® 10 obtained from U.S. Silica (Frederick, Md.), $BaSO_4$ and ZnO were as indicated in Table 5. For Example 12, uncoated particulates were prepared as in Examples 1-4, except that Epsom salt was used instead of $BaSO_4$, as indicated in Table 5. Additionally, the firing (or calcining) temperature and length of firing (or calcining) for each of the particulate mixtures were as indicated in Table 5.

TABLE 5

|  | Example 10 | Example 11 | Example 12 |
|---|---|---|---|
| Nepheline Syenite (wt %) | 40.0 | 40.0 | 40.0 |
| Kaolin (ASP ® G90) (wt %) | 25.0 | 25.0 | 25.0 |
| Plaster of Paris (wt %) | 19.0 | 19.0 | 19.0 |
| Silica (MIN-U-SIL ® 10) (wt %) | 10.0 | 10.0 | 10.0 |
| BaSO4 (wt %) | 6.0 | 0.0 | 0.0 |
| Epsom salt (wt %) | 0.0 | 0.0 | 3.25 |
| ZnO (wt %) | 0.0 | 6.0 | 2.75 |
| Firing (calcining) temp. (° C.) | 1125 | 1125 | 1125 |
| Firing (calcining) time (minutes) | 15-30 | 15-30 | 15-30 |
| Bulk Density (lbs/ft$^3$) | 59.6 | 65.8 | 56.9 |

The total solar reflectance (TSR) as well as the UV, VIS and IR reflectance of each of the uncoated calcined mixtures were evaluated, and the results are shown in Table 6.

TABLE 6

|  | Example 10 | Example 11 | Example 12 |
|---|---|---|---|
| UV (335-380 nm) (%) | 62.8 | 53.2 | 60.0 |
| VIS (400-540 nm) (%) | 85.3 | 81.9 | 84.8 |
| VIS (480-600 nm) (%) | 87.8 | 87.4 | 89.9 |
| VIS (590-720 nm) (%) | 90.8 | 91.1 | 93.3 |
| IR (700-1100 nm) (%) | 93.9 | 94.3 | 95.7 |
| IR (1000-1700 nm) (%) | 93.0 | 92.6 | 94.1 |
| IR (1700-2500 nm) (%) | 86.7 | 89.3 | 87.3 |
| TSR (%) | 89.5 | 88.7 | 90.7 |

As can be seen in Table 6, reflective particulates according to embodiments of the present invention exhibit good total solar reflectance, as well as good UV, VIS and IR reflectance with varying conFIGurations of the secondary pigment component.

Examples 13-18

Uncoated particulates were prepared as in Examples 1-4, except that the materials and amounts of the materials were as indicated in Table 7. Additionally, the firing (or calcining) temperature and length of firing (or calcining) for each of the particulate mixtures were as indicated in Table 7.

TABLE 7

|  | Ex. 13 | Ex. 14 | Ex. 15 | Ex. 16 | Ex. 17 | Ex. 18 |
| --- | --- | --- | --- | --- | --- | --- |
| Nepheline Syenite (wt %) | 40.0 | 37.0 | 40.0 | 30.0 | 40.0 | 40.0 |
| Kaolin (ASP ® G90) (wt %) | 25.0 | 25.0 | 25.0 | 25.0 | 25.0 | 25.0 |
| Plaster of Paris (wt %) | 0.0 | 19.0 | 0.0 | 19.0 | 0.0 | 0.0 |
| Ground Aplite (wt %) | 19.0 | 0.0 | 0.0 | 0.0 | 0.0 | 0.0 |
| Epsom salt (wt %) | 0.0 | 3.0 | 19.0 | 10.0 | 0.0 | 0.0 |
| $CaCO_3$ (wt %) | 0.0 | 0.0 | 0.0 | 0.0 | 19.0 | 0.0 |
| $MgCO_3$ (wt %) | 0.0 | 0.0 | 0.0 | 0.0 | 0.0 | 19.0 |
| Silica (MIN-U-SIL ® 10) (wt %) | 10.0 | 10.0 | 10.0 | 10.0 | 10.0 | 10.0 |
| BaSO4 (wt %) | 3.25 | 3.25 | 3.25 | 3.25 | 3.25 | 3.25 |
| ZnO (wt %) | 2.75 | 2.75 | 2.75 | 2.75 | 2.75 | 2.75 |
| Firing (calcining) temp. (° C.) | 1125 | 1150 | 1125 | 1150 | 1050 | 1150 |
| Firing (calcining) time (minutes) | 15-30 | 15-30 | 15-30 | 15-30 | 15-30 | 15-30 |
| Bulk Density (lbs/ft$^3$) | 69.5 | 59.6 | 69.5 | 69.4 | — | 73.5 |

The total solar reflectance (TSR) as well as the UV, VIS and IR reflectance of each of the uncoated calcined mixtures were evaluated, and the results are shown in Table 8.

TABLE 8

|  | Ex. 13 | Ex. 14 | Ex. 15 | Ex. 16 | Ex. 17 | Ex. 18 |
| --- | --- | --- | --- | --- | --- | --- |
| UV (335-380 nm) (%) | 52.5 | 55.8 | 50.8 | 45.6 | 59.1 | 40.8 |
| VIS (400-540 nm) (%) | 78.6 | 82.6 | 80.0 | 75.2 | 78.6 | 77.1 |
| VIS (480-600 nm) (%) | 81.3 | 88.1 | 84.7 | 81.6 | 80.2 | 83.4 |
| VIS (590-720 nm) (%) | 86.7 | 91.5 | 88.3 | 85.9 | 83.7 | 87.2 |
| IR (700-1100 nm) (%) | 90.0 | 94.3 | 90.8 | 87.9 | 89.1 | 88.2 |
| IR (1000-1700 nm) (%) | 88.7 | 93.9 | 89.2 | 87.8 | 91.7 | 87.4 |
| IR (1700-2500 nm) (%) | 84.1 | 92.0 | 84.3 | 85.8 | 90.4 | 83.0 |
| TSR (%) | 84.5 | 89.5 | 85.7 | 82.9 | 84.7 | 83.4 |

As can be seen in Table 8, reflective particulates according to embodiments of the present invention exhibit good total solar reflectance, as well as good UV, VIS and IR reflectance with varying conFIGurations of the hardness (or processibility) enhancer.

Example 19

Uncoated particulates were prepared as in Examples 1-4, except that the materials and amounts of the materials were as indicated in Table 9. Additionally, the firing (or calcining) temperature and length of firing (or calcining) for the particulate mixture were as indicated in Table 9.

TABLE 9

|  | Example 19 |
| --- | --- |
| Ground Aplite (wt %) | 40.0 |
| Kaolin (ASP ® G90) (wt %) | 25.0 |
| Plaster of Paris (wt %) | 19.0 |
| Silica (MIN-U-SIL ® 10) (wt %) | 10.0 |
| BaSO4 (wt %) | 3.25 |
| ZnO (wt %) | 2.75 |
| Firing (calcining) temp. (° C.) | 1125 |
| Firing (calcining) time (minutes) | 15-30 |
| Bulk Density (lbs/ft$^3$) | 54.3 |

The total solar reflectance (TSR) as well as the UV, VIS and IR reflectance of the uncoated calcined mixture of Example 19 were evaluated, and the results are shown in Table 10.

TABLE 10

|  | Example 19 |
| --- | --- |
| UV (335-380 nm) (%) | 53.5 |
| VIS (400-540 nm) (%) | 79.1 |
| VIS (480-600 nm) (%) | 83.9 |
| VIS (590-720 nm) (%) | 89.0 |
| IR (700-1100 nm) (%) | 92.2 |
| IR (1000-1700 nm) (%) | 91.7 |
| IR (1700-2500 nm) (%) | 90.7 |
| TSR (%) | 86.8 |

As can be seen in Table 10, reflective particulates according to embodiments of the present invention exhibit good total solar reflectance, as well as good UV, VIS and IR reflectance with varying conFIGurations of the feldspar and the clay.

Although various embodiments of the invention have been described, additional modifications and variations will be apparent to those skilled in the art. For example, the compositions and particulates may have additional components, which may be present in various suitable amounts, for example, other additives suitable to improve strength, reduce odor, and/or otherwise modify the properties of the composition and particulates manufactured. Similarly, the methods of preparing the compositions and particulates as described herein by way of example embodiments may be modified in accordance with the knowledge in the field to which the various embodiments pertain. For example, the methods of preparing the compositions and particulates may include additional steps, may be performed at various temperatures, and/or may be otherwise suitably modified (e.g., as described with reference to the compositions and particulates). As such, the invention is not limited to the embodiments specifically disclosed, and the composition, the particulates, and the methods of preparing the compositions and particulates may be modified without departing from the invention, which is limited only by the appended claims and equivalents thereof.

Throughout the text and claims, any use of the word "about" reflects the penumbra of variation associated with measurement, significant FIGures, and interchangeability, all as understood by a person having ordinary skill in the art to which this invention pertains. Further, as used herein, the term "substantially" is used as a term of approximation and not as a term of degree, and is intended to account for normal variations and deviations in the measurement or assessment associated with the composition, the particulates, and the method of preparing the compositions and particulates (e.g., in the description of physical or chemical properties of various components or compositions and in the description of amounts of various components).

What is claimed is:

1. A reflective particulate composition, comprising:
    a particulate mixture comprising:
        a particulate substrate comprising a feldspar and/or a sand,
        a hardness enhancer, and
        a pigment comprising a clay, the particulate substrate being present in the particulate mixture in an amount greater than an amount of the pigment; and
    a hydrophobic exterior coating on the particulate mixture.

2. The reflective particulate composition according to claim 1, wherein the particulate mixture without the hydrophobic exterior coating has a total solar reflectance of 70% or greater.

3. The reflective particulate composition according to claim 1, wherein the particulate substrate comprises the feldspar.

4. The reflective particulate composition according to claim 3, wherein the feldspar comprises nepheline syenite.

5. The reflective particulate composition according to claim 3, wherein the feldspar is present in the particulate mixture in an amount of 20 wt % to 60 wt % based on 100 wt % of the particulate mixture.

6. The reflective particulate composition according to claim 3, wherein the particulate substrate further comprises the sand, and the sand comprises a silica-based sand.

7. The reflective particulate composition according to claim 6, wherein the silica-based sand is present in the particulate mixture in an amount of 3 wt % to 20 wt % based on 100 wt % of the particulate mixture.

8. The reflective particulate composition according to claim 1, wherein the hardness enhancer comprises Plaster of Paris, Epsom salt, aplite, calcium carbonate, magnesium carbonate, and/or sodium carbonate.

9. The reflective particulate composition according to claim 1, wherein the hardness enhancer comprises Plaster of Paris.

10. The reflective particulate composition according to claim 1, wherein the hardness enhancer is present in an amount of 10 wt % or greater based on 100% by weight of the particulate mixture.

11. The reflective particulate composition according to claim 1, wherein the clay comprises a kaolin clay, and the pigment comprises a clay-based pigment composition comprising the kaolin clay in an amount of 50% by weight or greater based on 100% by weight of the clay-based pigment composition.

12. The reflective particulate composition according to claim 11, wherein the pigment is present in the particulate mixture in an amount of 45 wt % or less based on 100 wt % of the particulate mixture.

13. The reflective particulate composition according to claim 11, wherein the clay-based pigment composition further comprises a secondary pigment component selected from the group consisting of transition metal oxides, alkaline earth metal sulfates, alkaline earth metal silicates, alkali metal silicates, and cristobalite.

14. The reflective particulate composition according to claim 13, wherein the secondary pigment component comprises Epsom salt, $BaSO_4$, $SrCO_3$, $BaCO_3$, $ZrSiO_4$, $Ca_2SiO_4$, $Ba_2SiO_4$, magnesium silicate, SnO and/or ZnO.

15. The reflective particulate composition according to claim 13, wherein the secondary pigment component is present in the particulate mixture in an amount of 1 wt % to 15 wt % based on 100 wt % of the particulate mixture.

16. The reflective particulate composition according to claim 1, wherein the hydrophobic exterior coating comprises a silane and/or a siloxane.

17. A method of making the reflective particulate composition according to claim 1, the method comprising:
    mixing the particulate substrate, the hardness enhancer, the pigment and a liquid medium to form the particulate mixture;
    heat treating the particulate mixture; and
    mixing the particulate mixture with a hydrophobic coating composition to form the hydrophobic exterior coating on the particulate mixture.

18. The method according to claim 17, wherein the hydrophobic coating composition comprises a silane and/or siloxane, and a liquid diluting medium.

19. The method according to claim 17, further comprising crushing the particulate mixture prior to the heat treatment.

20. The method according to claim 19, further comprising drying the particulate mixture before the crushing.

21. A method of making the reflective particulate composition according to claim 1, the method comprising:
    mixing the particulate substrate, the hardness enhancer, the pigment and a liquid medium to form the particulate mixture;
    drying the particulate mixture at a temperature up to about 800° C. to form a dried particulate mixture;
    crushing the dried particulate mixture to form a crushed particulate mixture and fine particulates;
    mixing the fine particulates with additional amounts of the particulate substrate, the hardness enhancer, the pigment and the liquid medium to form a second particulate mixture;
    heat treating the crushed particulate mixture and the second particulate mixture; and
    mixing the crushed particulate mixture and the second particulate mixture with a hydrophobic coating composition to form the hydrophobic exterior coating on the crushed particulate mixture and the second particulate mixture.

22. The method according to claim 21, wherein the fine particulates have a particle size sufficient to pass through a 40 mesh or smaller sieve.

* * * * *